June 22, 1937. F. LINDER 2,084,815
DRIVING MECHANISM
Original Filed Nov. 26, 1932
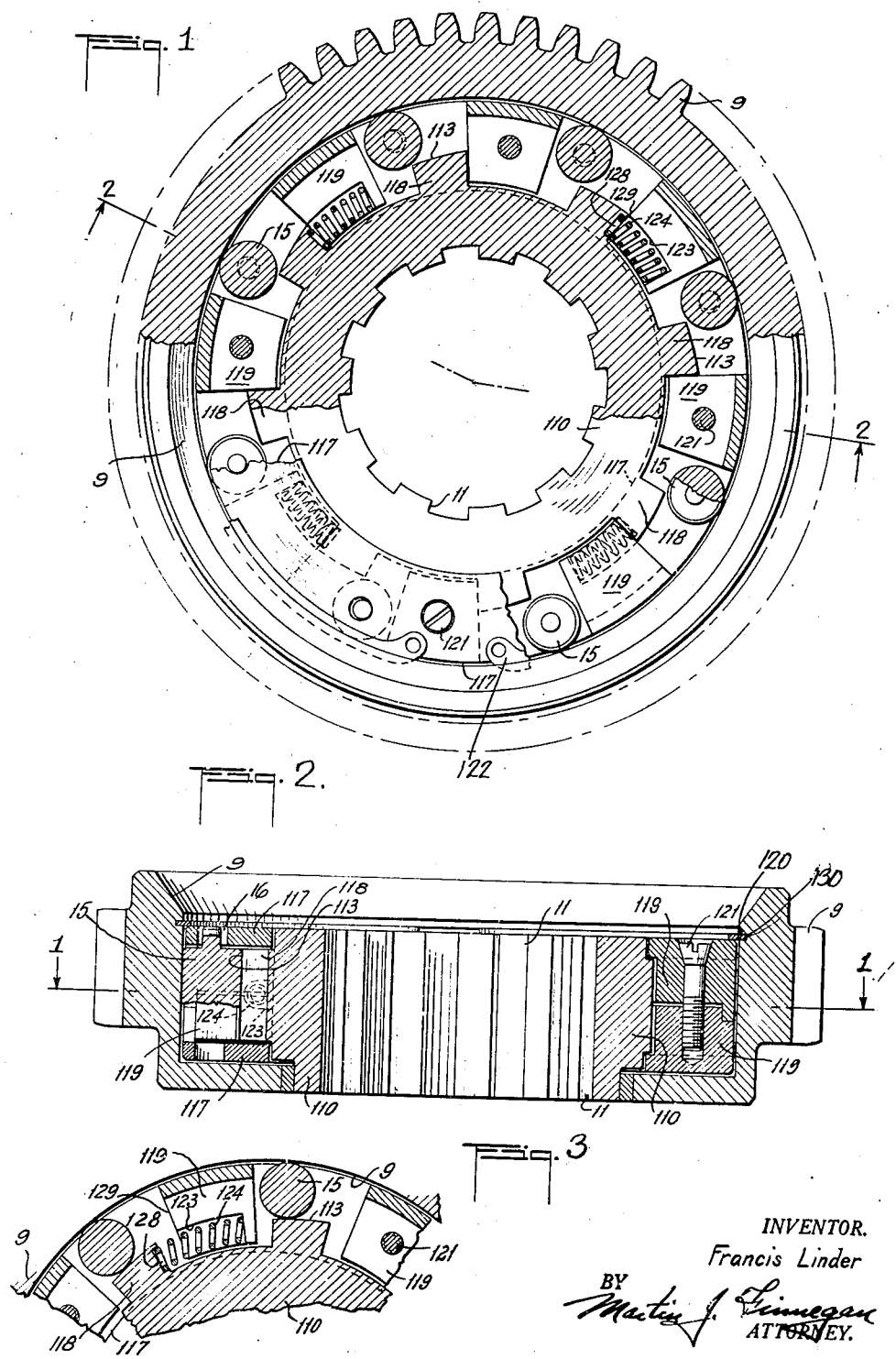
INVENTOR.
Francis Linder
BY
Martin J. Finnegan
ATTORNEY.

Patented June 22, 1937

2,084,815

UNITED STATES PATENT OFFICE 2,084,815

DRIVING MECHANISM

Francis Linder, Paris, France, assignor, by mesne assignments, to Eclipse Aviation Corporation, East Orange, N. J., a corporation of New Jersey Original application November 26, 1932, Serial No. 644,497. Divided and this application February 2, 1935, Serial No. 4,723

2 Claims. (Cl. 192—45)

This invention relates to clutches of the class frequently called "overrunning clutches" which provide an automatically releasable driving connection between relatively revoluble members.

One of the objects of the invention is to provide releasable connection between the driving and driven members through the agency of rollers, while avoiding or preventing frictional or sliding engagement of the rollers with each other or with the other elements of the structure, such as frequently occurs in devices of this class, and tends to cause wear and "flat" areas on the rollers.

In this connection a feature of the invention is the provision of novel mounting means for the torque transmitting rollers, said novel mounting means being preferably in the form of a cage in which the rollers are journalled for limited angular movement as well as free rotation about their individual axes, whereby the rollers can more readily roll freely along the surface of the outer race of the clutch when not transmitting torque.

Another object of the invention is to provide a novel clutch of the foregoing character in which the torque transmitting rollers, when no torque is being transmitted, (that is, when free wheeling or overrunning is occurring) are completely out of contact with the inner race of the clutch.

These and other objects of the invention will become apparent upon consideration of the following specification, when read with reference to the accompanying drawing, wherein is illustrated the preferred embodiment of the invention. It is to be expressly understood, however, that the drawing is for the purpose of illustration only, and is not designed as a definition of the limits of the invention, reference being had for this purpose to the appended claims.

In the drawing,

Fig. 1 is an elevational view partly in section along the line 1—1 of Fig. 2, of one embodiment of the invention;

Fig. 2 is a longitudinal sectional view along the line 2—2 of Fig. 1; and

Fig. 3 is a fragmentary diagrammatic view of the parts shown in Fig. 1, as they appear during the period of positive drive.

In the following description and in the claims, it is assumed for purposes of illustration that the direction of torque transmission will be from the outer race of the clutch to the inner race, and that the outer race accordingly constitutes the driving member, and the inner race the driven member; but it is to be understood that if the direction of torque transmission is reversed, the following description and claims will nevertheless be applicable to such a reversed arrangement if the word "driven" is read "driving" and the word "driving" is read "driven".

With the foregoing in mind, and referring first to Fig. 1, the driving member is shown in the form of a gear 9 adapted to receive energy from a prime mover, such as the crankshaft of an internal combustion engine, while the driven member 110 is shown as of annular form, with its inner surface splined as indicated at 11 for engagement with corresponding splines on the shaft to be driven, as for example, the propeller shaft of a motor vehicle, or an extension of the armature shaft of a generator. As shown, all points on the inner surface of the driving gear 9 are equidistant from the common axis about which the elements 9 and 110 both rotate, while the outer surface of the element 110 is irregular and includes a plurality of cam surfaces 113, the curvature of which is such as to produce a number of tapering pockets between the elements 9 and 110, the successive pockets being separated by the interposition of the members 119 to be further described.

The rollers 15 of the clutch are preferably of uniform size, with each roller machined down to a small diameter at either end so as to be received in drilled holes 16 of somewhat larger diameter, said holes being provided at properly spaced positions adjacent the outer surface of a pair of annular plates 117. These plates 117 constitute a cage within which the rollers 15 may adjust themselves to variable bearing points by reason of the larger diameter of the holes 16. These bearing areas thus facilitate free rotation of the rollers when not transmitting torque between the elements 9 and 110.

It will be seen that in the relative positioning of the parts as shown in Fig. 1, the rollers are out of contact with the cam surfaces 113 of the inner race 110 of the clutch, and this represents the condition when the driven shaft is overrunning, and no torque is being transmitted. During such periods, the rollers 15 roll freely along the inner surface of the gear 9 and have a limited gyratory, as well as a free rotary movement about the surfaces of the holes 16 in the cage 117.

In order to maintain this condition of free rolling action, means are provided for holding the cage 117 in the relative position indicated in Fig. 1 during the overrunning (free wheeling) period, and such means further acts to shift said cage 117 through a sufficient arc relatively to the driven member 110 to carry all the rollers 15 into position to transmit torque as soon as the rotation of the driven shaft is retarded, or that of the driving gear 9 accelerated. As shown, such means includes a series of radial projections 118 integral with the inner race 110 and engageable with a corresponding number of segments 119 of the annular plates 117 to constitute a cage for the rollers 15. In addition to the roller cage, there is preferably a roller retaining strip 120 of substantially annular shape and adapted to register with an annular groove cut in the inner surface of the gear 9 as indicated at 130 in Fig. 2, the strip 120 being sprung into position by pressure upon the inwardly turned ends 122. As shown in Fig. 1, the ends 122 are apertured to permit the insertion of tongs or other tools to facilitate installation of the retaining strip. Preferably segments 119 are apertured for reception of screws 121 serving to hold the two parts of the cage in assembled relation. Preferably, each alternate segment 119 is bored laterally to provide pockets 123 for compression springs 124 which assist the movement of the cage 117 (along with the driving gear 9) in a clockwise direction as viewed in Fig. 1 when the first driving impulse occurs in gear 9. This first torque impulse acts to move the cage 117 into a position in which the rollers 15 are wedged against the cam surfaces 113 of the inner race 110, thus establishing a positive drive to said inner race.

This positive drive continues, with the parts in the relative positions indicated in Fig. 3 until a condition of overrunning occurs, whereupon the spring engaging faces 128 of the projections 118 of the inner race advance toward the adjacent faces 129 of the cage segments 119, the strength of the springs 124 being insufficient to transmit this accelerating movement of the inner race to said segments 119 by reason of the inertia of the latter.

This slight relative motion between the inner race 110 and the cage 117 is sufficient to dislodge the rollers 15 and return the parts to the relative positions indicated in Fig. 1, which relative positions will be maintained so long as the overrunning continues. When the gear 9 again takes up the drive, it carries the rollers 15 back to the wedging relation to the cam surfaces 113 by virtue of the assistance afforded by the springs 124 in resisting advance of the inner race 110 until the wedging relation indicated in Fig. 3 is established. In other words, the establishment of wedging relation is facilitated by the expansion by springs 124 from their relatively compressed position as shown in Fig. 1 to the more expanded position of Fig. 3.

This application is a division of my co-pending application No. 644,497, filed November 26, 1932, and resulting in Patent No. 2,029,244 granted January 28, 1936.

What I claim is:

1. An overrunning clutch comprising a driving member, a driven member, a roller cage interposed therebetween and concentric therewith and capable of only limited angular play relative to said driven member, rollers journalled in said cage, said rollers having supporting ends free to gyrate relative to said cage, whereby each roller may move out of contact with the driven member as well as the driving member during a portion of each revolution, and means disposed between successive rollers for advancing said cage through a sufficient arc relatively to said driven member to carry all said rollers into position to transmit torque from said driving member to said driven member.

2. An overrunning clutch comprising a driving member, a driven member, a roller cage interposed therebetween and concentric therewith and capable of only limited angular play relative to said driven member, rollers journalled in said cage, said rollers having supporting ends free to gyrate relative to said cage, to thereby enable said rollers to avoid friction with the driving member, and means disposed between successive rollers for advancing said cage through a sufficient arc relatively to said driven member to carry all said rollers into position to transmit torque from said driving member to said driven member.

FRANCIS LINDER.